United States Patent Office.

CARL DUISBERG, OF ELBERFELD, PRUSSIA, GERMANY, ASSIGNOR TO THE FARBENFABRIKEN, VORMALS FR. BAYER & CO., OF SAME PLACE.

MANUFACTURE OF COLORING-MATTERS.

SPECIFICATION forming part of Letters Patent No. 394,841, dated December 18, 1888.

Application filed August 1, 1888. Serial No. 281,663. (Specimens.)

*To all whom it may concern:*

Be it known that I, CARL DUISBERG, residing at Elberfeld, in the Kingdom of Prussia and Empire of Germany, have invented a new and useful Improvement in the Manufacture of Dye-Stuffs or Coloring-Matters, of which the following is a specification.

My invention relates to the production of new yellow dye-stuffs by the action of tetrazo compound of benzidine, tolidine, and diamidodiphenolether upon cresol carbonic acid.

In carrying out my invention practically I proceed as follows: Ten (10) kilos of benzidine sulphate are suspended in a finely-comminuted condition in one hundred and fifty liters water. In this twenty (20) kilos of muriatic acid of 21° Baumé are added, and when this solution is cooled by ice, five (5) kilos sodium nitrite dissolved in water are gradually added. In this way a solution of tetrazodiphenylethroid is formed, which is now poured into a solution of eleven (11) kilos of cresol carbonic acid in forty kilos sodium hydrate and two hundred and fifty liters water, while stirring violently. By this reaction the following combination is formed:

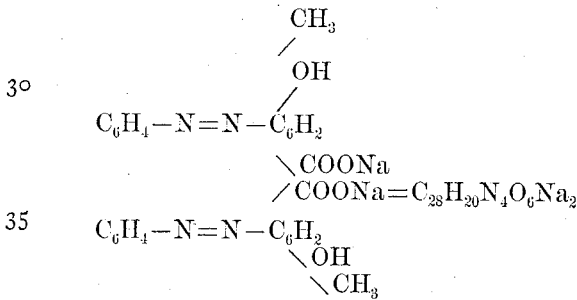

which is a brown-yellow amorphous precipitate. After being allowed to rest for several hours, the formed precipitate is filtered and dried. In the dry state it represents a brown-red powder, which is insoluble in cold water, but more soluble in hot water, and easily, however, in boiling soap bath, with a yellow color. By addition of alkali to the acqueous solution the yellow color turns red-brown. By mineral acid the color disappears and a precipitate forms. In concentrated sulphuric acid the coloring-matter dissolves with a violet color. Unmordanted cotton is dyed yellow-red, (in a boiling soap bath,) and is conspicuous for producing shades fast to scouring and sunlight.

If instead of benzidine the homologous tolidine or diamido-diphenolether is substituted, colors of the same properties are produced.

Having thus described my invention, I claim as new and desire to secure by Letters Patent—

As a new product, the yellow coloring-matter herein described, which has the following qualities: it exists as a brown-yellow amorphous precipitate; in the dry state it represents a brown-red powder, which is insoluble in cold water, but more soluble in hot water, and easily, however, in boiling soap bath, with a yellow color; by the addition of alkali to the aqueous solution the yellow color turns red-brown; by mineral acid the color disappears and a precipitate forms; in concentrated sulphuric acid the coloring-matter dissolves with a violet color; unmordanted cotton is dyed yellow-red, (in a boiling soap bath,) and is conspicuous for producing shades fast to scouring and sunlight, substantially as described.

CARL DUISBERG.

Witnesses:
 WM. DIESTEL,
 CARL HEIMPEL.